H. R. PALMER.
DRY CELL BATTERY.
APPLICATION FILED MAR. 2, 1917.
1,231,057.
Patented June 26, 1917.
2 SHEETS—SHEET 1.
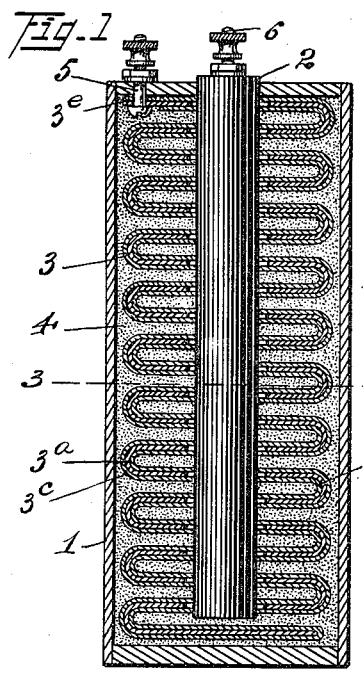
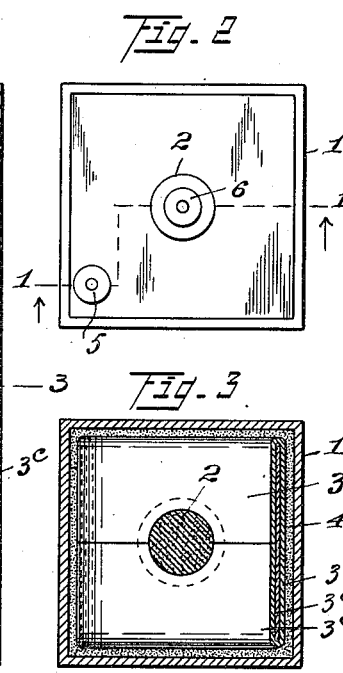
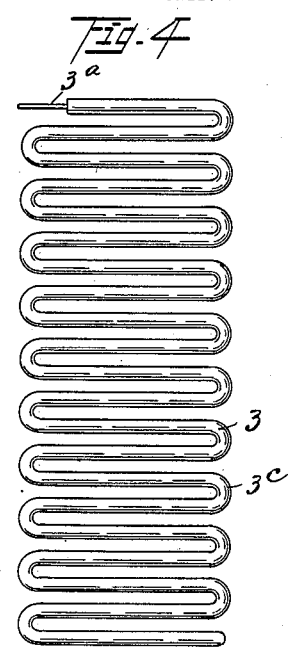
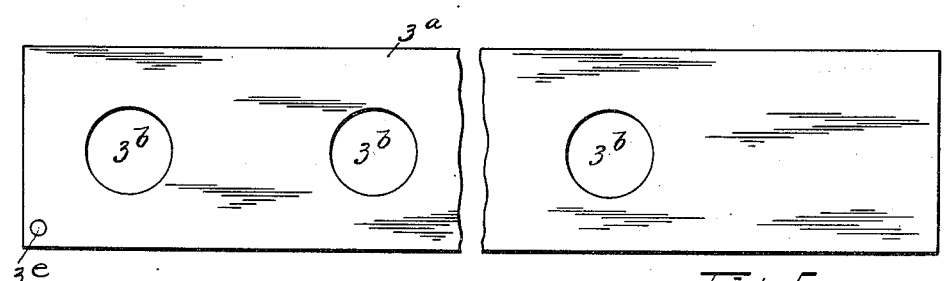
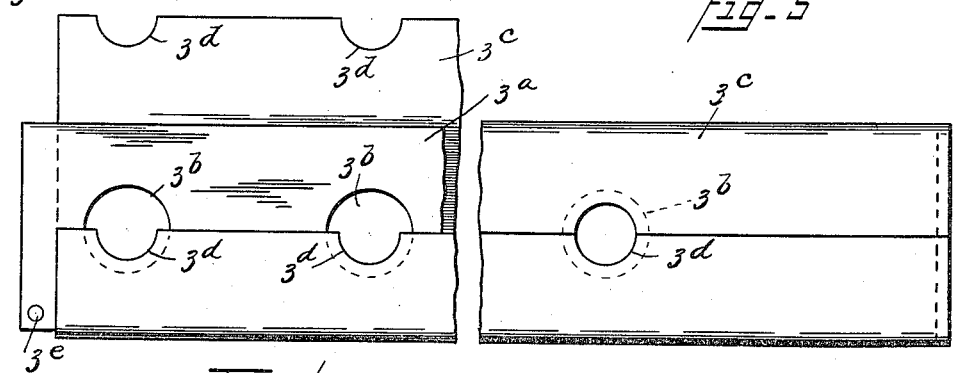
Inventor
Herbert R. Palmer
by Norris F. Griswold
Atty.

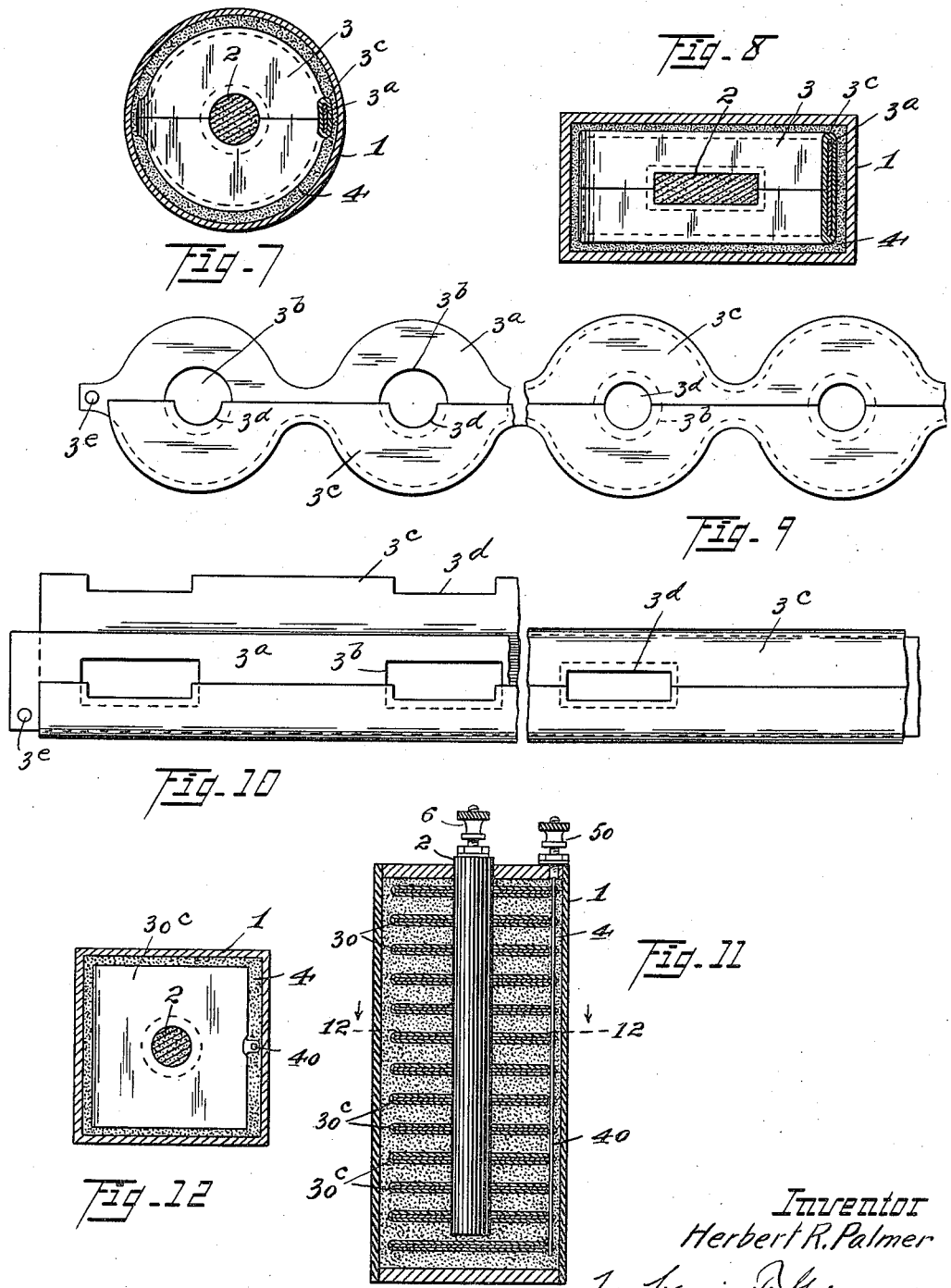

UNITED STATES PATENT OFFICE.

HERBERT R. PALMER, OF CLEVELAND, OHIO.

DRY-CELL BATTERY.

1,231,057.

Specification of Letters Patent.  Patented June 26, 1917.

Application filed March 2, 1917. Serial No. 152,062.

*To all whom it may concern:*

Be it known that I, HERBERT R. PALMER, a citizen of the United States, residing at Cleveland, in the county of Cuyahoga and State of Ohio, have invented a certain new and useful Improvement in Dry-Cell Batteries, of which the following is a specification.

This invention relates to the construction of dry-cell batteries, or batteries of the Leclanché type in which the life or durability of electric discharge is dependable primarily upon the depolarizing or hydrogen absorbing action of the manganese dioxid ($MnO_2$) in close contact with a medium which separates the zinc or active element of the cell from the depolarizing medium.

It is a fact readily understood by those familiar with the battery art, that the larger the zinc area presented to the $MnO_2$, the less current per area unit is generated, and consequently the less depolarizing load is imposed upon the $MnO_2$ in intimate contact with said area. Consequently the larger the zinc area in proportion to the size of the cell, the longer the life of the cell and the larger the output at any given time, without excessive drain upon the life of the $MnO_2$. In the ordinary type of Leclanché round cell dry battery where the container and active element are one, being a zinc cylindrical casing, the larger the casing, or active element, the longer the life of the cell; therefore in order to increase the life of the cell or to admit of a larger depolarizing load on the $MnO_2$ it is, in the ordinary construction above mentioned, necessary to increase the dimensions of the cell in order to present a greater zinc or active element area to contact the depolarizer or $MnO_2$.

The object of the present invention is to increase the efficiency of a battery cell of the type set forth without increasing the volume or weight of the cell. The said object is realized by the employment of one carbon or positive pole and the utilization of both sides of one zinc or negative pole, the said elements in combination with the depolarizing element being so arranged and confined in a cell of a given size so that the life on a given load is increased approximately 300% over the ordinary cell of the same size and weight. Therefore the invention consists in the construction, combination, and arrangement of the elements as illustrated in the accompanying drawings, described in the specification and pointed out definitely in the annexed claims.

In the said drawings, which form a part of the specification, similar characters of reference are employed to designate similar parts, and Figure 1 is a vertical section of a preferred form of the improved cell on line 1—1 of Fig. 2. Fig. 2 is a plan view. Fig. 3 is a cross-section on line 3—3 of Fig. 1. Fig. 4 illustrates the anode detached. Fig. 5 shows the core or active element of the anode before being enveloped and corrugated. Fig. 6 illustrates two further steps in the formation of the anode. Figs. 7 and 8 are cross-sections of cells of different contour. Fig. 9 illustrates the anode used in the type shown in Fig. 7. Fig. 10 shows the anode used in the type shown in Fig. 8. Fig. 11 is a central vertical section of a modified form, and Fig. 12 is a cross-section on line 12—12 of Fig. 11.

For various reasons such as economy, convenience, and facility in assembling, the preferred form of the improved cell is square or rectangular in cross-section, although the same principles of increased efficiency are manifest in a circular cell, as illustrated.

In the explanation of the construction of the improved cell, reference will first be made to Figs. 1, 2 and 3 which illustrate the cell as square in cross-section, and wherein 1 represents a container, 2 an electrode, 3 the anode, and 4 the depolarizing mixture or $MnO_2$. The anode consists of a strip of zinc $3^a$ of predetermined width and length, provided with holes $3^b$ regularly spaced for the purpose as hereinafter set forth. The strip $3^a$ is first enveloped in porous material such as bibulous paper $3^c$, and then bent or corrugated so as to take the sinuous form shown in Figs. 1 and 4. The holes $3^b$ are so disposed that when the anode is formed as shown, said holes will register and form a continuous vertical opening through the several leaves of the sinuous anode. The vertical opening or tunnel thus formed is adapted to receive the carbon electrode 2. The holes $3^b$ in the zinc are of greater contour dimension than the electrode, while the holes $3^d$ in the envelop member are of substantially the same dimension as the transverse dimension of said electrode. By this arrangement the edges of the holes in the zinc are covered with the porous element and kept free from contact with the electrode 2.

The depolarizing mixture 4 containing the MnO₂ is packed within the container 1 around the electrode 2 and around and between the leaves of the anode 3, as shown in Figs. 1 and 3. The zinc member 3ᵃ is provided with an eye 3ᵉ to accommodate a binding screw 5, and the electrode 2 is provided with a binding screw 6.

For the purpose of clearly demonstrating the increased efficiency of the improved cell, the following comparative example is submitted. In the common 6"x2⅓" diameter around cell with zinc container, said container being the active element, the area of zinc in actual contact with the MnO₂, including the bottom is 41 square inches. In a square cell of the improved type 6"x2½" square, a sinuous anode of twelve leaves 2"x2" may be employed, this gives 48 square inches on one side or 96 square inches total of two sides, both being exposed to the depolarizer. Allowing nine square inches for the holes around the electrode gives 87 square inches actual exposed anode area, or more than twice the anode area of the ordinary cell of the same over all dimensions.

By referring to Fig. 7 which illustrates an embodiment of the improvement in a round cell, it will be noted that the same principles prevail, the combination and arrangement of the several elements being the same, but the configuration of the anode differing. The same principles are also carried out in the form shown in Fig. 8 where a rectangular electrode is used.

In the modification illustrated in Figs. 11 and 12, a series of zinc plates 30 covered with porous envelops 30ᶜ, are connected by a manifold conductor 40 provided with the binding screw 50. The plates 30 and envelops 30ᶜ are provided with apertures to receive the electrode 2 and the depolarizing mixture 4 is packed in the container 1 around the electrode and anode members the same as in the preferred form. While the same principle of increased anode area prevails in the last described modification, it is not considered a desirable construction owing to the cost and the difficulty in assembling, it is therefore merely shown as an anticipation.

What I claim and desire to secure by Letters Patent is:

1. A battery of the character described comprising a closed container, an anode consisting of a series of connected leaves of active material enveloped in absorbent material and provided with registering holes, an electrode inserted in said holes, and a depolarizing mixture packed in said container around the electrode between and around the leaves of the anode.

2. A battery of the character described comprising a container, an anode consisting of a strip of active material sinuous in formation thereby forming a continuous series of opposing members, an envelop of absorbent material surrounding said sinuous strip, said anode provided with registering holes through the opposing members thereof, an electrode inserted in said holes, and a depolarizing mixture packed in said container around the electrode and around the anode.

3. An anode for dry-cell batteries, comprising a series of connected leaves of zinc enveloped in absorbent material, arranged in parallel planes and spaced apart, said leaves being provided with registering holes adapted to receive an electrode.

4. An anode for dry-cell batteries, comprising a zinc strip of sinuous formation thereby forming a series of connected opposing members spaced apart, said zinc strip being enveloped in absorbent material and the opposing members being provided with registering holes adapted to receive an electrode.

5. A dry-cell battery comprising in combination a container, an anode consisting of a series of flat connected zinc leaves arranged in parallel planes and spaced apart, an absorbent enveloping member covering said leaves, said parallel leaves being provided with registering holes, an electrode passing through said holes, and a depolarizing mixture packed in said container around the electrode between and around said anode.

6. A dry-cell battery comprising in combination a container, an anode consisting of a continuous zinc strip sinuous in formation thereby forming a series of continuous connected opposing leaf members, said opposing leaf members being spaced apart, an envelop of absorbent material surrounding said sinuous strip on all surfaces, said anode provided with registering holes through the leaf members, an electrode passing through said holes, and a depolarizing mixture packed in said container around the electrode around and in contact with all surfaces of the anode.

HERBERT R. PALMER.